United States Patent
Dimpault-Darcy et al.

(10) Patent No.: US 11,201,358 B1
(45) Date of Patent: Dec. 14, 2021

(54) SYSTEMS AND METHODS FOR MEASURING A HEAT RESPONSE OF A BATTERY CELL IN THERMAL RUNAWAY

(71) Applicant: USA as represented by the Administrator of the National Aeronautics and Space Administration, Washington, DC (US)

(72) Inventors: Eric C Dimpault-Darcy, Houston, TX (US); John J. Darst, Houston, TX (US); William Q. Walker, Houston, TX (US); Steven L. Rickman, League City, TX (US); Natalie N. Anderson, Crosby, TX (US); Christiaan Khurana, Houston, TX (US); Bruce L. Drolen, Altadena, CA (US); Gary Bayles, Millersville, MD (US); Zoran Bilc, Houston, TX (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 376 days.

(21) Appl. No.: 16/175,152

(22) Filed: Oct. 30, 2018

Related U.S. Application Data (60) Provisional application No. 62/668,596, filed on May 8, 2018.

(51) Int. Cl.
| | | |
|---|---|---|
| *G01K 17/00* | (2006.01) | |
| *H01M 10/42* | (2006.01) | |
| *H01M 10/48* | (2006.01) | |

(52) U.S. Cl.
CPC ........ *H01M 10/4285* (2013.01); *G01K 17/00* (2013.01); *H01M 10/486* (2013.01)

(58) Field of Classification Search
CPC combination set(s) only.
See application file for complete search history.

(56) References Cited

U.S. PATENT DOCUMENTS

| | | | |
|---|---|---|---|
| 4,439,048 A | 3/1984 | Townsend et al. | |
| 6,833,707 B1 * | 12/2004 | Dahn ................ | H01M 10/4285 324/426 |

(Continued)

FOREIGN PATENT DOCUMENTS

| | | |
|---|---|---|
| CN | 204203436 U | 3/2015 |
| CN | 103837834 B | 5/2016 |

(Continued)

OTHER PUBLICATIONS

Xuning Feng et al. "Thermal runaway features of large format prismatic lithium ion battery using extended volume accelerating rate calorimetry", Journal of Pwer Sources, vol. 255, pp. 294-301, 2014. (Year: 2014).*

(Continued)

*Primary Examiner* — Lisa M Caputo
*Assistant Examiner* — Nasir U. Ahmed
(74) *Attorney, Agent, or Firm* — Kurt G. Hammerle; Edward K. Fein (57) ABSTRACT

A system for measuring a heat response of a cell during a thermal runaway event includes a housing. An insulation is positioned within the housing. A calorimeter is positioned within the insulation and the housing. The calorimeter is configured to have the cell positioned therein. The calorimeter is configured to measure a temperature increase of the cell, one or more components of the calorimeter, or a combination thereof during the thermal runaway event of the cell. A total energy yield of the thermal runaway event is configured to be determined based at least partially upon the temperature increase. A ratio is configured to be determined based at least partially upon the temperature increase. The (Continued)

ratio includes energy released through a casing of the cell during the thermal runaway event vs. energy released through ejecta material from the cell during the thermal runaway event.

20 Claims, 11 Drawing Sheets

(56) References Cited

U.S. PATENT DOCUMENTS

| | | | |
|---|---|---|---|
| 7,518,336 | B2 | 4/2009 | Sellers |
| 8,356,933 | B2 | 1/2013 | Pinhack |
| 8,926,172 | B2 | 1/2015 | Wu |
| 9,476,780 | B2 | 10/2016 | Keyser et al. |
| 9,490,507 | B2 | 11/2016 | Bandhauer et al. |
| 9,583,903 | B1 | 2/2017 | Miller et al. |
| 9,658,146 | B2 | 5/2017 | Olson et al. |
| 2016/0341609 | A1 | 11/2016 | Ubelhor et al. |

FOREIGN PATENT DOCUMENTS

| | | |
|---|---|---|
| CN | 105588854 A | 5/2016 |
| KR | 100714153 B1 | 5/2007 |

OTHER PUBLICATIONS

Hiroaki Ishikawa et al. "Study of thermal deterioration of lithium-ion secondary cell using an accelerated rate calorimeter (ARC) and AC impedance method", Journal of Power Sources, vol. 198, pp. 236-242, 2012. (Year: 2012).*

Paul T. Coman et al. "A lumped model of venting during thermal runaway in a cylindrical Lithium Cobalt Oxide lithium-ion cell", Journal of Power Sources, vol. 307, pp. 56-62, 2016. (Year: 2016).*

Crafts, Chris C., et al. "Advanced technology development program for lithiumion batteries: thermal abuse peformance of 18650 Li-ion cells." No. SAND2004-0584, Sandia Nation.

Ribiére, Perrine, et al. "Investigation on the fire-induced hazards of Li-ion battery cells by fire calorimetry." Energy & Enviornmental Science 5.1 (2012):5271-5280.

Crafts, Chris C., Theodore T. Borek III, and Curtis Dale Mowry. "Safety testing of 18650-style Li-ion cells." No. SAND2000-1454C. Sandia National Labs., Albuquerque, NM (US).

Doughty, Daniel Harvey, and Chris C. Crafts. "FreedomCAR: electrical energy storage system abuse test manual for electric and hybrid electric vehicle applications." No. SAND20.

* cited by examiner

SYSTEMS AND METHODS FOR MEASURING A HEAT RESPONSE OF A BATTERY CELL IN THERMAL RUNAWAY

CROSS-REFERENCE TO RELATED APPLICATIONS

This application claims priority to U.S. Provisional Patent Application No. 62/668,596, filed on May 8, 2018, the entirety of which is incorporated by reference herein.

ORIGIN OF THE INVENTION

The invention described herein was made by employee(s) of the United States Government and may be manufactured and used by or for the Government of the United States of America for governmental purposes without the payment of any royalties thereon or therefor.

BACKGROUND

Thermal runaway occurs in situations where an increase in temperature changes the conditions in a way that causes a further increase in temperature, often leading to a destructive result. It is a type of uncontrolled positive feedback. In chemical applications, thermal runaway is associated with strong exothermic reactions that are accelerated by an increase in temperature. In electrical applications, thermal runaway is associated with increased current flow and power dissipation.

Thermal runaway may occur to battery cells, such as lithium-ion (Li-ion) cells. It would be desirable to be able to test battery cells, while rapidly triggering the battery cells into thermal runaway, to determine the fraction of energy that dissipates via conduction through the can of a battery cell versus the fraction of energy that is released in the form of ejecta.

SUMMARY

A system for measuring a heat response of a cell during a thermal runaway event is disclosed. The system includes a housing. An insulation is positioned within the housing. A calorimeter is positioned within the insulation and the housing. The calorimeter is configured to have the cell positioned therein. The calorimeter is configured to measure a temperature increase of the cell, one or more components of the calorimeter, or a combination thereof during the thermal runaway event of the cell. A total energy yield of the thermal runaway event is configured to be determined based at least partially upon the temperature increase. A ratio is configured to be determined based at least partially upon the temperature increase. The ratio includes energy released through a casing of the cell during the thermal runaway event vs. energy released through ejecta material from the cell during the thermal runaway event.

In another embodiment, the system includes a housing. An insulation is positioned at least partially within the housing. A calorimeter is positioned at least partially within the insulation and the housing. The calorimeter includes a cell chamber configured to have the cell positioned therein. The cell chamber is configured to receive a heater, a nail, or both to initiate the thermal runaway event. The calorimeter also includes a first ejecta mating assembly coupled to a first side of the cell chamber and configured to capture one or more electrode windings from the cell during the thermal runaway event. The calorimeter also includes a first ejecta bore assembly coupled to the first ejecta mating assembly and configured to capture ejecta material from the cell during the thermal runaway event. The calorimeter is configured to measure a temperature increase of the cell, the cell chamber, the first ejecta mating assembly, the first ejecta bore assembly, or a combination thereof during the thermal runaway event of the cell. A computer system is configured to determine a total energy yield of the thermal runaway event based at least partially upon the temperature increase, and a ratio based at least partially upon the temperature increase. The ratio includes energy released through a casing of the cell during the thermal runaway event vs. energy released through ejecta material from the cell during the thermal runaway event.

A method for measuring a heat response of a cell in thermal runaway is also disclosed. The method includes placing a cell in a cell chamber of a calorimeter. The method also includes placing the calorimeter in insulation. The method also includes triggering a thermal runaway event for the cell. The method also includes measuring a temperature increase of the cell, one or more components of the calorimeter, or a combination thereof during the thermal runaway event. The method also includes determining a ratio based at least partially upon the temperature increase. The ratio includes energy released through a casing of the cell during the thermal runaway event vs. energy released through ejecta material from the cell during the thermal runaway event.

Other aspects and features of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the presently described subject matter and should not be used to limit it. The present subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIGS. 6A and 6B illustrate two opposing sides of the cell chamber, according to an embodiment. More particularly.

FIGS. 7A-7C illustrate perspective views of the ejecta mating assembly, according to an embodiment. More particularly.

DETAILED DESCRIPTION

Lithium-ion (Li-ion) batteries deliver competitive energy storage solutions to a growing global market that spans the aerospace, automotive, medical, military and defense, portable electronics, railway, and space-exploration industries. Although this technology is characterized by leading performance characteristics, Li-ion battery utilization is burdened with safety concerns due to the inherent possibility of thermal runaway (TR). Thermal runaway is a process by which the Li-ion cell experiences rapid exothermic decomposition that ultimately results in the release of heat and high-temperature gases and other ejected material. An aspect to successful thermal modeling of battery cells, and thereby developing safe, high-performing battery designs, is to quantify the total energy released, and then to discern the fractional energy liberated through the cylindrical casing or "can" of a battery cell, such as 18650 Li-ion cell, as compared to the fractional energy ejected from the casing/can when the cell goes into thermal runaway.

Figure 1:
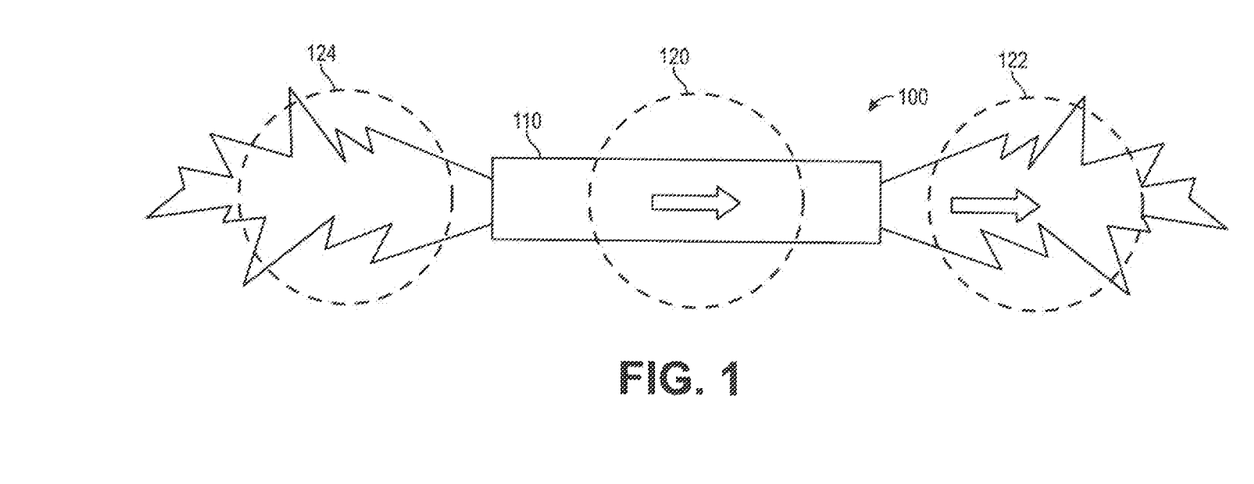
FIG. 1 illustrates a Li-ion cell during a thermal runaway event, according to an embodiment.

FIG. 1 illustrates a Li-ion cell 100 during a thermal runaway event, according to an embodiment. As described above, the Li-ion cell 100 may include an outer casing (also referred to as a can) 110 and internal electrode winding/stack-up material. The Li-ion cell 100 in thermal runaway has one or more (e.g., two or three) fractions of energy. A first fraction 120, liberated through the casing 110, may be measured by sensing a temperature increase in/of cell chamber assembly components containing the Li-ion cell 100. The other fraction(s) 122, 124, ejected from end(s) of the casing 110, may be measured by sensing an increase in temperature in/of ejecta mating assemblies and ejecta bore assemblies containing the ejected material, as described in greater detail below.

Figure 2:
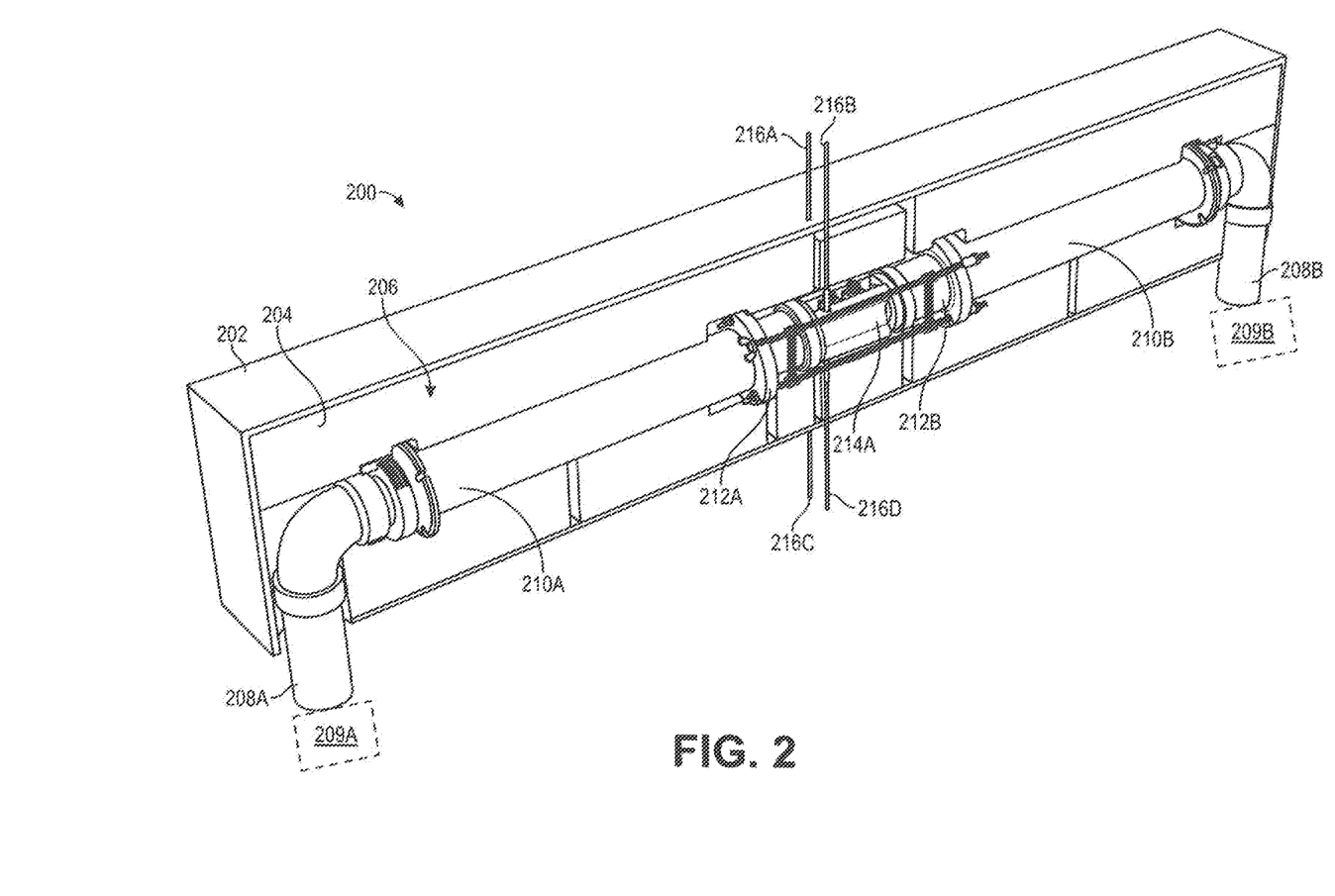
FIG. 2 illustrates a system for testing the Li-ion cell during the thermal runaway event, according to an embodiment.

FIG. 2 illustrates a system 200 for testing the Li-ion cell 100 during a thermal runaway event, according to an embodiment. The system 200 may include a housing 202. The housing 202 may be or include a portable, molded shell made at least partially of plastic. The housing 202 protects the insulation 204 and calorimeter positioned therein, as discussed below.

The system 200 may also include an insulation 204 that is positioned at least partially within the housing 202. The insulation 204 have a conductivity that is less than or equal to about 0.04 W m$^{-2\circ}$ C.$^{-1}$, less than or equal to about 0.02 W m$^{-2\circ}$ C.$^{-1}$, or less than or equal to about 0.01 W m$^{2\circ}$ C.$^{-1}$. The system 200 may also include a fractional thermal runaway calorimeter (FTRC) 206. As shown, the calorimeter 206 may be positioned at least partially (e.g., completely) within the housing 202 and/or the insulation 204 with the possible exception of the exhaust ports described below. As described below, the calorimeter 206 may be configured to measure total heat response and/or fractional heat response of a cell (e.g., the Li-ion cell 100) during a thermal runaway event.

The calorimeter 206 may include one or two exhaust ports/vents (two are shown: 208A, 208B). More particularly, the calorimeter 206 may include a first (e.g., negative) side exhaust port 208A and a second (e.g., positive) side exhaust port 208B. Gases ejected from a first (e.g., negative) terminal of the Li-ion cell 100 can exit the calorimeter 206 via the negative side exhaust port 208A, and gases ejected from a second (e.g., positive) terminal of the Li-ion cell 100 can exit the calorimeter 206 via the positive side exhaust port 208B. In at least one embodiment, the exhaust ports 208A, 208B may be or include vents that are drilled into the housing 202.

In at least one embodiment, the calorimeter 206 may also include a gas collection system 209A, 209B coupled to the exhaust ports 208A, 208B and/or to a muffler, and the gas collection system 209A, 209B may capture and/or measure heat in the gas from the Li-ion cell 100. More particularly, the gas collection system 209A, 209B may measure and quantify the heat transferred through the ejected gases by measuring the exhaust gas temperature, flow rate, and/or volume. The gas collection system 209A, 209B may also sample the gas and perform a composition analysis. For example, the gas collection system 209A, 209B may include an internal bag that fills with the gases generated from the thermal runaway event. As the bag inflates, it may push the air inside the gas collection system 209A, 209B outward through a gas (e.g., air) velocity sensor.

The calorimeter 206 may also include one or two ejecta bore assemblies (two are shown: 210A, 210B). More particularly, the calorimeter 206 may include a first (e.g., negative) side ejecta bore assembly 210A and a second (e.g., positive) side ejecta bore assembly 210B. During a thermal runaway event, the Li-ion cell 100 may eject material (i.e., ejecta material) from one or both sides/terminals of the cell 100. The negative side ejecta bore assembly 210A may capture the ejecta material from the negative terminal of the Li-ion cell 100, and the positive side ejecta bore assembly 210B may capture the ejecta material from the positive terminal of the Li-ion cell 100. The ejecta bore assemblies 210A, 210B may be configured to measure the energy associated with the ejecta material leaving the Li-ion cell 100 due to thermal runaway. As used here, ejecta material refers to ejected soot, ejected cell materials, and/or generated gases.

The calorimeter 206 may also include one or two ejecta mating assemblies (two are shown: 212A, 212B). More particularly, the calorimeter 206 may include a first (e.g., negative) side ejecta mating assembly 212A and a second (e.g., positive) side ejecta mating assembly 212B. During a thermal runaway event, in addition to the ejecta material, the Li-ion cell 100 may also eject complete or partial electrode windings from one or both sides/terminals of the cell 100. The negative side ejecta mating assembly 212A may capture the electrode windings ejected from the negative terminal of the Li-ion cell 100, and the positive side ejecta mating assembly 212B may capture electrode windings ejected from the positive terminal of the Li-ion cell 100. In other words, the ejecta mating assemblies 212A, 212E may prevent the windings from reaching the ejecta bore assemblies 210A, 210B. The ejecta mating assemblies 212A, 212B may also measure the energy specifically associated with the ejected electrode windings. The ejecta mating assemblies 212A, 212B may be thermally-isolated from the cell chamber 214A (introduced below).

The symmetry presented by the positive and negative sides of the ejecta bore assemblies 210A, 210B and the ejecta mating assemblies 212A, 212B may provide a dual-sided, ambidextrous testing configuration that supports gases, ejecta material, and windings that are ejected from both the positive and negative terminals of the cell. However, in other embodiments, the calorimeter 206 may provide a single-sided testing configuration (e.g., including the negative side ejecta bore assembly 210A and the negative side ejecta mating assembly 212A and omitting the positive side ejecta bore assembly 210E and the positive side ejecta mating assembly 212B).

The calorimeter 206 may also include a cell chamber 214A where the Li-ion cell 100 may be placed for testing. The cell chamber 214A may be configured to measure the energy emitted from the Li-ion cell 100 during/due to thermal runaway. The cell chamber 214A may support a heater trigger mechanism and/or provide a mounting interface for an optional nail-penetration trigger mechanism, as discussed below. The cell chamber 214A may also include x-ray transparent materials to support in-situ, high-speed tomography and/or x-ray videography during thermal runaway testing. The cell chamber 214A may be centrally-located in the calorimeter 206. As shown, the cell chamber 214A in FIG. 2 is sized and shaped to receive an 18650 Li-ion cell; however, as will be discussed below, differently-sized cell chambers may be used in the calorimeter 206 to receive Li-ion cells of different sizes.

The calorimeter 206 may also include one or more cartridge heaters (four are shown: 216A-D) that may be used to trigger the Li-ion cell 100 into thermal runaway by thermal heating.

Figure 3A:
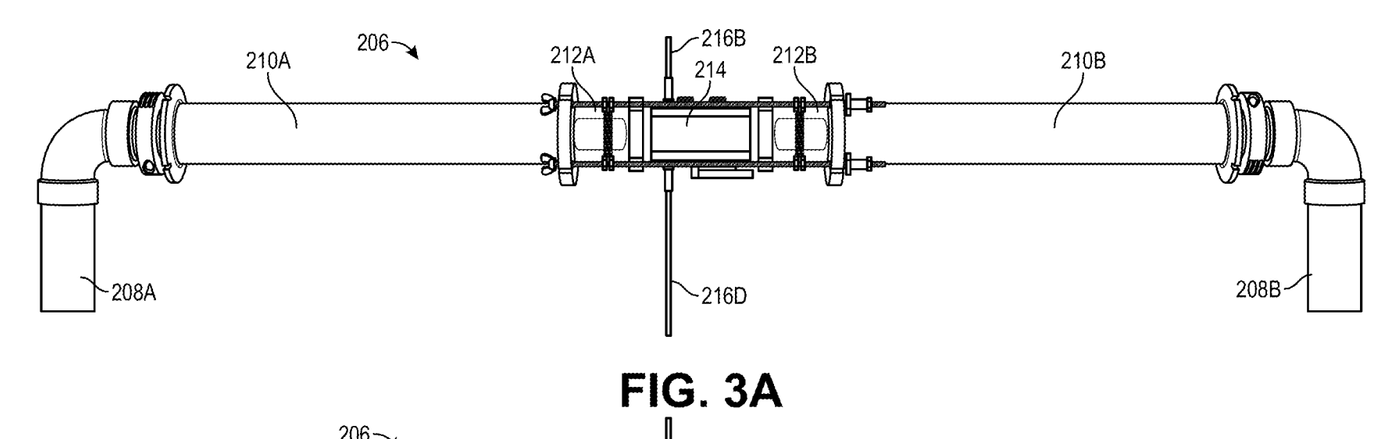
FIGS. 3A and 3B illustrate an external view and an internal view of a calorimeter in the system, respectively, according to an embodiment.
Figure 3B:
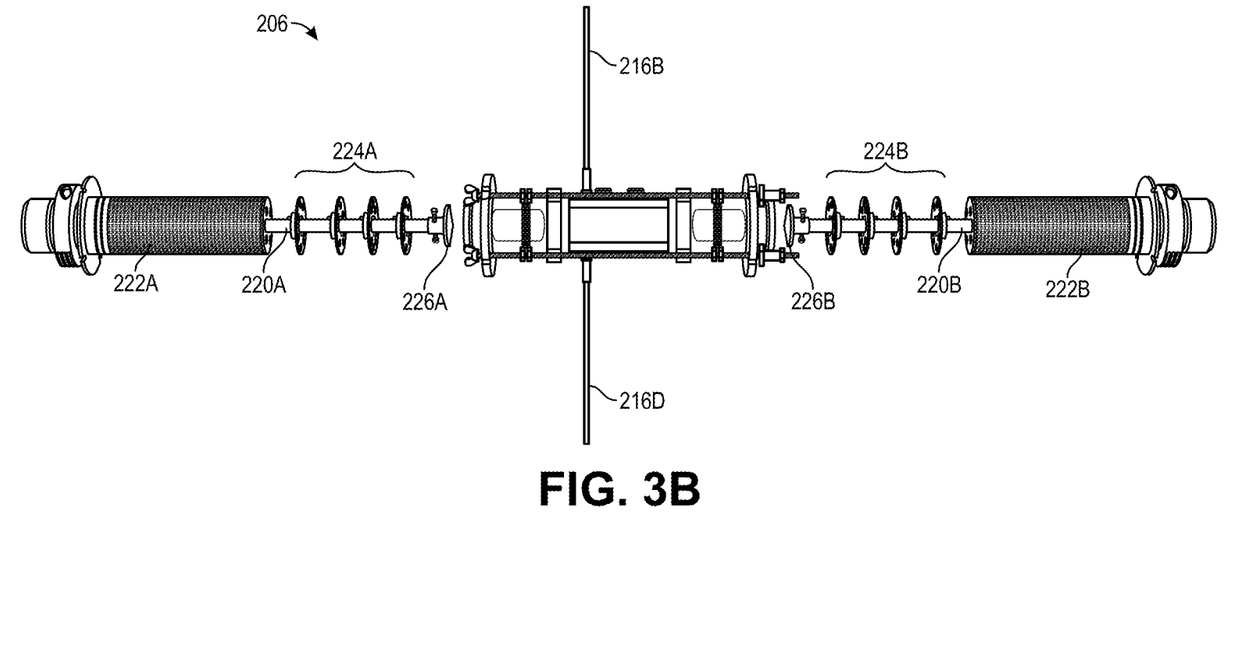

FIG. 3A illustrates an external side view of the calorimeter 206, according to an embodiment. FIG. 3B illustrates an internal side view of the calorimeter 206, according to an embodiment. The calorimeter 206 may also include one or more rods (two are shown: 220A, 220B). More particularly, the calorimeter 206 may include a first (e.g., negative) side rod 220A and a second (e.g., positive) side rod 220B.

The calorimeter 206 may also include one or more high-conductivity mesh screens (two are shown: 222A, 222B). More particularly, the calorimeter 206 may include a first (e.g., negative) side mesh screen 222A and a second (e.g., positive) side mesh screen 222B. The mesh screens 222A, 222B may be made of a metallic material such as copper. The mesh screens 222A, 222B may be positioned at least partially around the rods 220A, 220B, respectively. The mesh screens 222A, 222B may be annular or cylindrical.

The calorimeter 206 may also include one or two sets of axial baffles (two sets are shown: 224A, 224B). More particularly, the calorimeter 206 may include a first set of (e.g., negative) side axial baffles 224A and a second set of (e.g., positive) side axial baffles 224B. The baffles 224A, 224B may be positioned at least partially around the rods 220A, 220B, respectively, and axially-offset from the mesh screens 222A, 222B, respectively. Each set of baffles 224A, 224B may include from about one to about ten baffles, from about two to about eight baffles, or from about three to about six baffles. The mesh screens 222A, 222B and/or the baffles 224A, 224B may decelerate and trap ejecta to vent gases that are emitted from the Li-ion cell when in a state of thermal runaway.

The calorimeter 206 may also include one or more witness plates (two are shown: 226A, 226B) designed to withstand the impact of the initial thermal runaway blast. More particularly, the calorimeter 206 may include a first (e.g., negative) side witness plate 226A and a second (e.g., positive) side witness plate 226B. The witness plates 226A, 226B may be positioned at least partially around and/or coupled to inner ends of the rods 220A, 220B, respectively. As shown, the negative side axial baffles 224A may be positioned axially-between the negative side mesh screen 222A and the negative side witness plate 226A, and the positive side axial baffles 224B may be positioned axially-between the positive side mesh screen 222B and the positive side witness plate 226B. Together, the mesh screens 222A, 222B, the baffles 224A, 224B, and/or the witness plates 226A, 226B create a tortuous path that arrests the flame(s) of thermal runaway and prevent material from leaving the calorimeter 206.

Figure 4A:
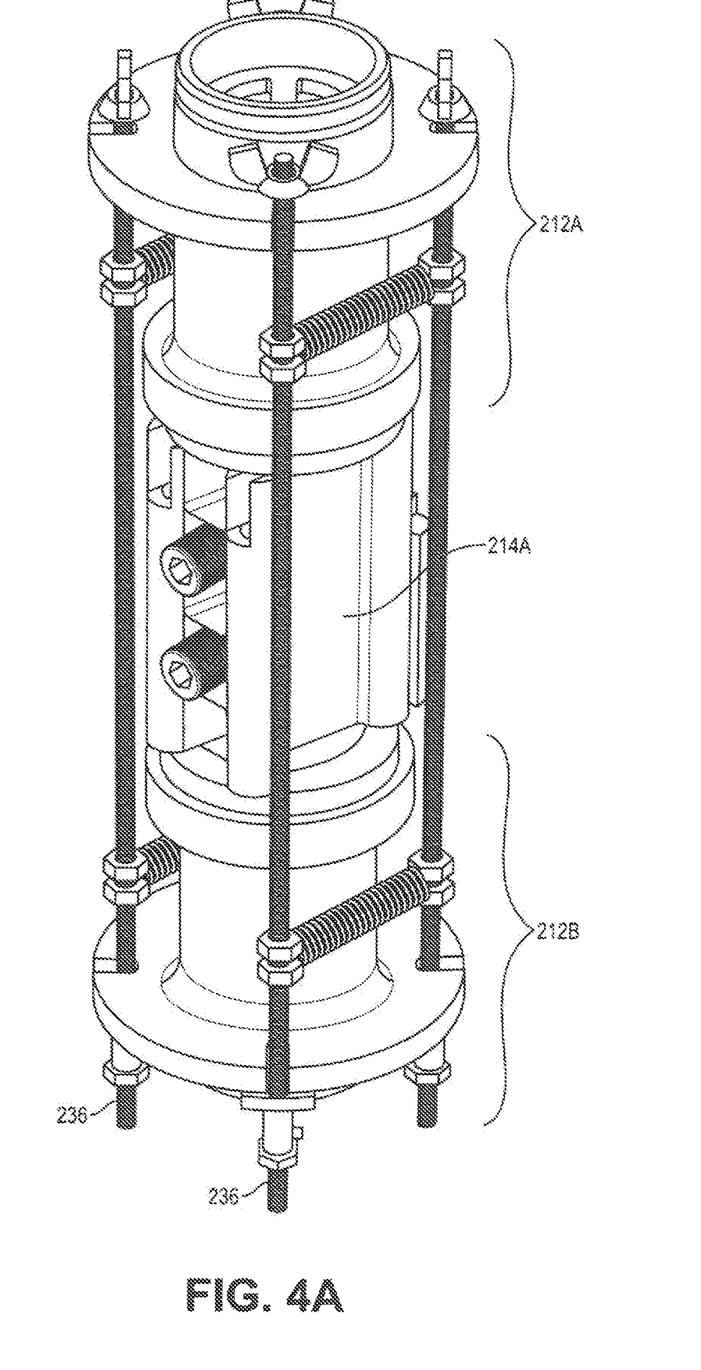
FIG. 4A illustrates a perspective view of a cell chamber and positive and negative side ejecta mating assemblies of the calorimeter, according to an embodiment.
Figure 4B:
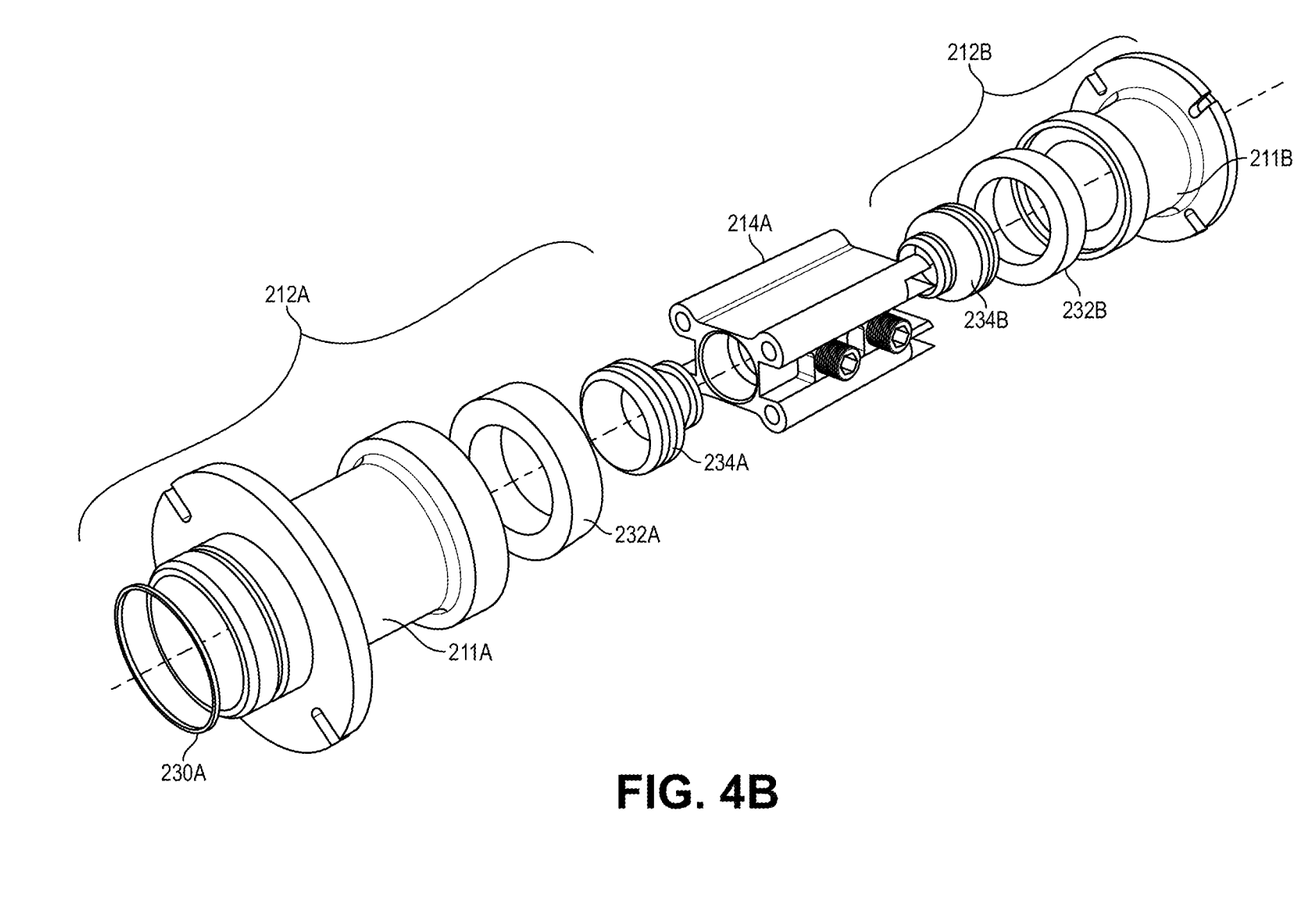
FIGS. 4B and 4C illustrate exploded, perspective views of FIG. 4A, according to an embodiment.
Figure 4C:
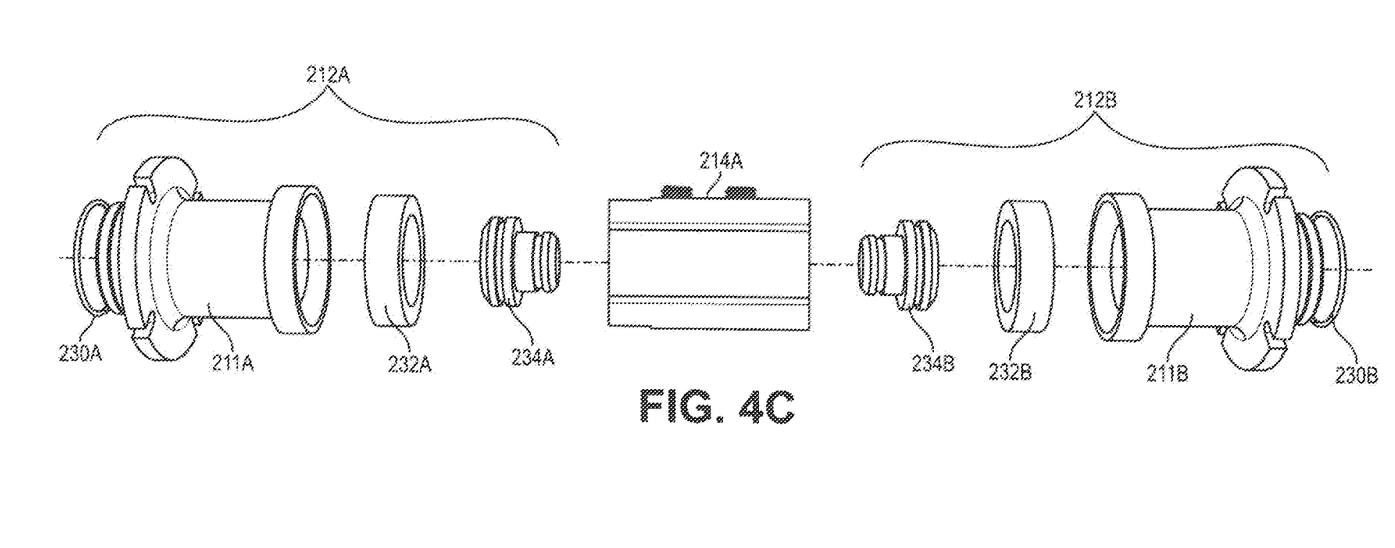

FIG. 4A illustrates a perspective view of the cell chamber 214A (e.g., configured to fit an 18650 Li-ion cell) and the positive and negative side ejecta mating assemblies 212A, 212B, according to an embodiment. FIGS. 4B and 4C illustrate exploded, perspective views of FIG. 4A, according to an embodiment. The ejecta mating assemblies 212A, 212B may each include a first seal (two are shown: 230A, 230B). More particularly, the negative side ejecta mating assembly 212A may include a first negative side seal 230A configured to contact an outer side of a negative side ejecta mating component 211A, and the positive side ejecta mating assembly 212B may include a first positive side seal 230B configured to contact an outer side of a positive side ejecta mating component 211B. The first seals 230A, 230B may be or include elastomeric O-rings.

The ejecta mating assemblies 212A, 212B may each also include a low thermal conductivity bushing (two are shown: 232A, 232B). More particularly, the negative side ejecta mating assembly 212A may include a bushing 232A configured to fit at least partially within an inner side of the negative side ejecta mating component 211A, and the positive side ejecta mating assembly 212B may include a bushing 232B configured to fit at least partially within an inner side of the positive side ejecta mating component 211B. The bushings 232A, 232B may be at least partially ceramic.

The ejecta mating assemblies 212A, 212B may each also include a second seal (two are shown: 234A, 234B). More particularly, the negative side ejecta mating assembly 212A may include a second negative side seal 234A configured to fit at least partially within the negative side ejecta mating component 211A and/or the negative side bushing 232A, and the positive side ejecta mating assembly 212B may include a second positive side seal 234B configured to fit at least partially within the positive side ejecta mating component 211B and/or the positive side bushing 232B. The second seals 234A, 234B may also be configured to contact or otherwise fit at least partially within opposing sides of the cell chamber 214A. The second seals 234A, 234B may be or include metallic (e.g., brass) pressure-assisted seals.

As shown in FIG. 4A, the calorimeter 206 may also include one or more brackets and/or clamps 236. The brackets and/or clamps 236 may be spring-loaded and configured to hold the components shown in FIGS. 4A-4C together. The brackets and/or clamps 236 may be used to quickly assemble and disassemble at least a portion of the calorimeter 206.

Figure 5A:
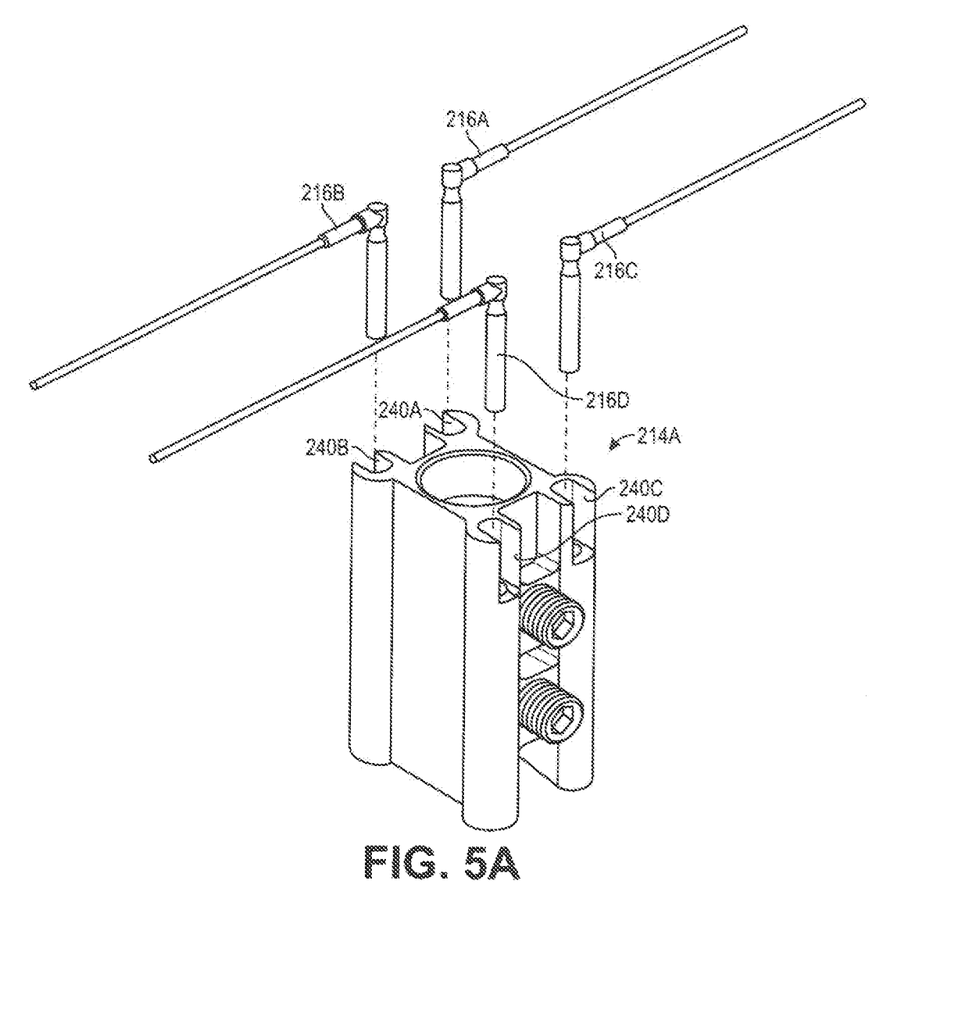
FIG. 5A illustrates a perspective view of the cell chamber for a Li-ion 18650 cell, according to an embodiment.
Figure 5B:
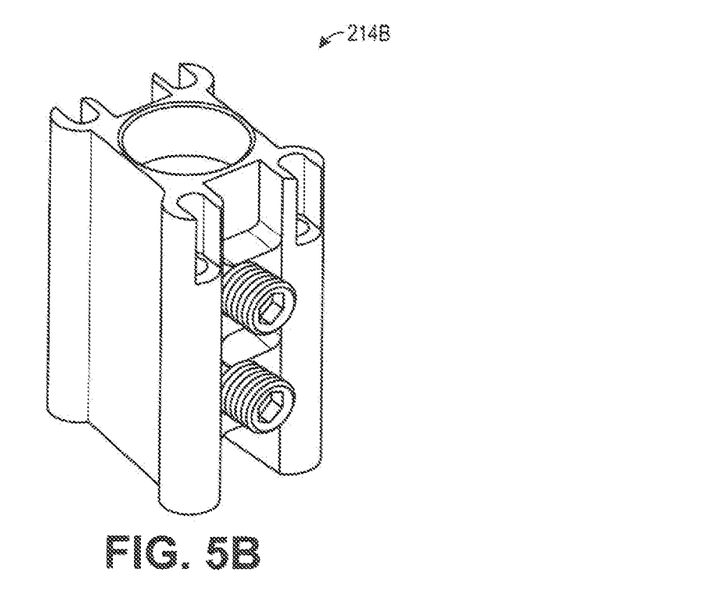
FIG. 5B illustrates a perspective view of a cell chamber for a Li-ion 21700 cell, according to an embodiment.

FIG. 5A illustrates a perspective view of the cell chamber 214A for an 18650 Li-ion cell, according to an embodiment. FIG. 5B illustrates a perspective view of a cell chamber 214B for a 21700 Li-ion cell, according to an embodiment.

Figure 5C:
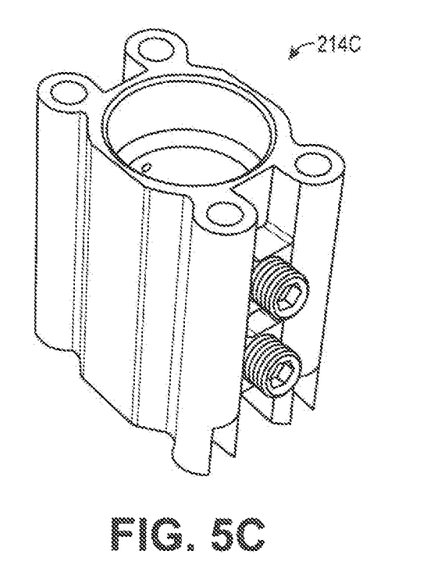
FIG. 5C illustrates a perspective view of a cell chamber for a Li-ion D-cell, according to an embodiment.

FIG. 5C illustrates a perspective view of a cell chamber 214C for a D-cell, according to an embodiment. As will be appreciated, the cell chambers 214A-C may be substantially identical, except for being sized and/or shaped differently to accommodate differently-sized and/or differently-shaped Li-ion cells.

As may be seen in FIG. 5A, the cell chamber 214A may include one or more slots (four are shown: 240A-D) that are configured to receive at least a portion of the one or more cartridge heaters 216A-D. The slots 240A-D may be positioned on the four corners of the cell chamber 214A.

Figure 6A:
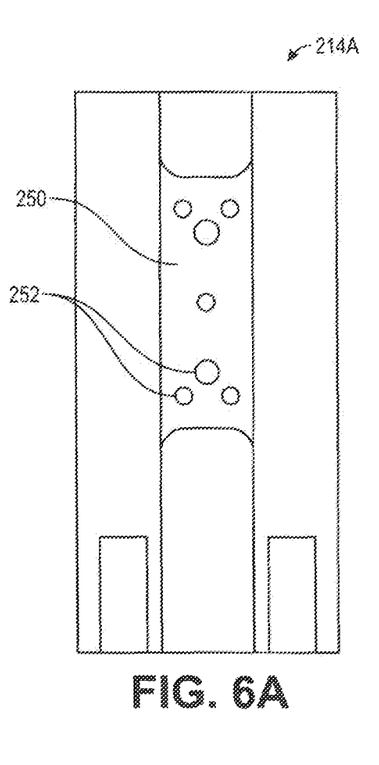
FIG. 6A illustrates a side view of a first side of the cell chamber including a nail-penetration system mount interface.
Figure 6B:
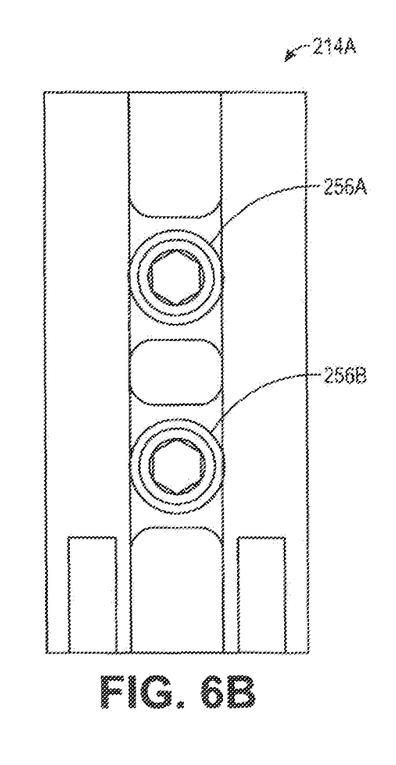
FIG. 6B illustrates a side view of a second, opposing side of the cell chamber including one or more (e.g., two) universal thermocouple set screws, according to an embodiment.

FIGS. 6A and 6B illustrate two opposing sides of the cell chamber 214A, according to an embodiment. More particularly, FIG. 6A illustrates a side view of a first side of the cell chamber 214A, according to an embodiment. As shown in FIG. 6A, the first side may include a nail-penetration system mount interface 250. The nail-penetration system mount interface 250 may include one or more openings (seven are shown: 252) configured to receive nails that may contact the Li-ion cell 100 and initiate the thermal runaway event. The nails may be used instead of, or in addition to, the cartridge heaters 216A-D to initiate the thermal runaway event.

FIG. 6B illustrates a side view of a second, opposing side of the cell chamber 214A, according to an embodiment. As shown in FIG. 6B, the second side may include one or more universal thermocouple set screws (two are shown: 256A, 256B). The screws 256A, 256B are configured to measure changes (e.g., increases) in temperature during testing (e.g., during thermal runaway). The increases in temperature may be used/combined with the known mass and specific heat capabilities of the components in the calorimeter 206 to determine the energy change of the system 200. In at least one embodiment, the interface 250 and/or the screws 256A, 256B may be universal for the cell chambers 214A-C.

Figure 7A:
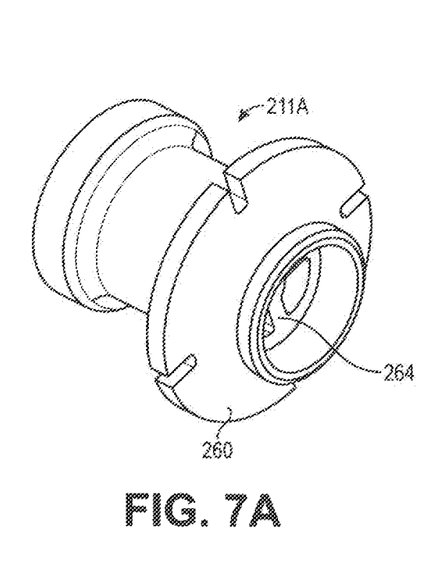
FIGS. 7A and 7B show an upstream view of the calorimeter ejecta mating assembly.
Figure 7B:
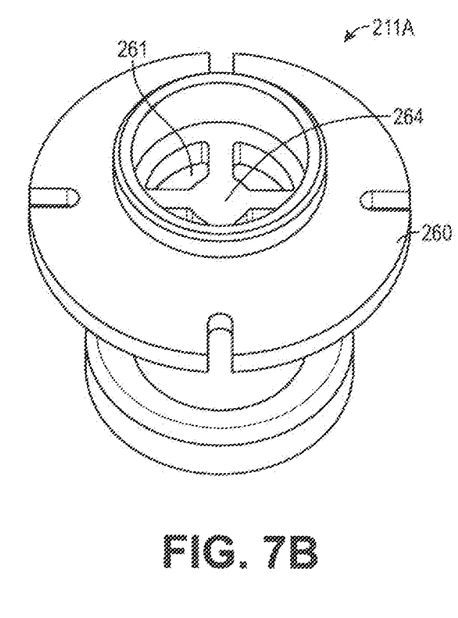
Figure 7C:
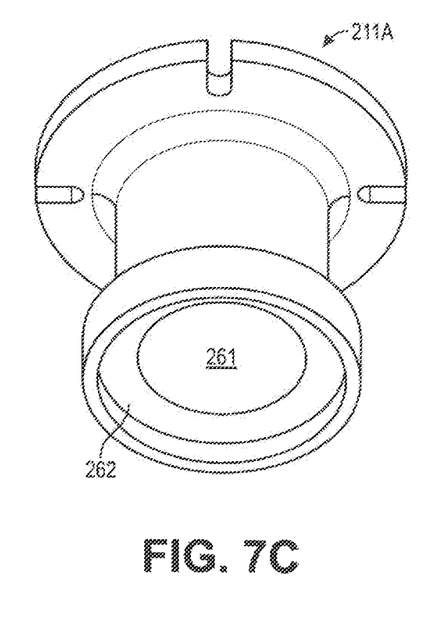
FIG. 7C shows a downstream view of the ejecta mating assembly, according to an embodiment.

FIGS. 7A-7C illustrate perspective views of the negative side ejecta mating component 211A, according to an embodiment. The ejecta mating component 211A may have a bore 261 extending axially-therethrough. FIGS. 7A and 7B show an upstream view of the negative side ejecta mating component 211A, according to an embodiment. The upstream side 260 of the ejecta mating component 211A may be proximate to the cell chamber 214A and configured to receive the bushing 232A. FIG. 7C shows a downstream view of the ejecta mating component 211A, according to an embodiment. The downstream side 262 of the ejecta mating component 211A may be proximate to the ejecta bore assembly 210A. The downstream side 262 may include an obstruction 264 that is configured to prevent ejected electrode windings from passing therethrough while allowing the gases and/or ejecta material to pass therethrough. As shown, the obstruction 264 may be in the form of a crosshair. Although the negative side ejecta mating component 211A is shown in FIGS. 7A-7C, in at least one embodiment, the positive side ejecta mating component 211B may be identical and is thus omitted here to prevent redundancy.

Figure 8:
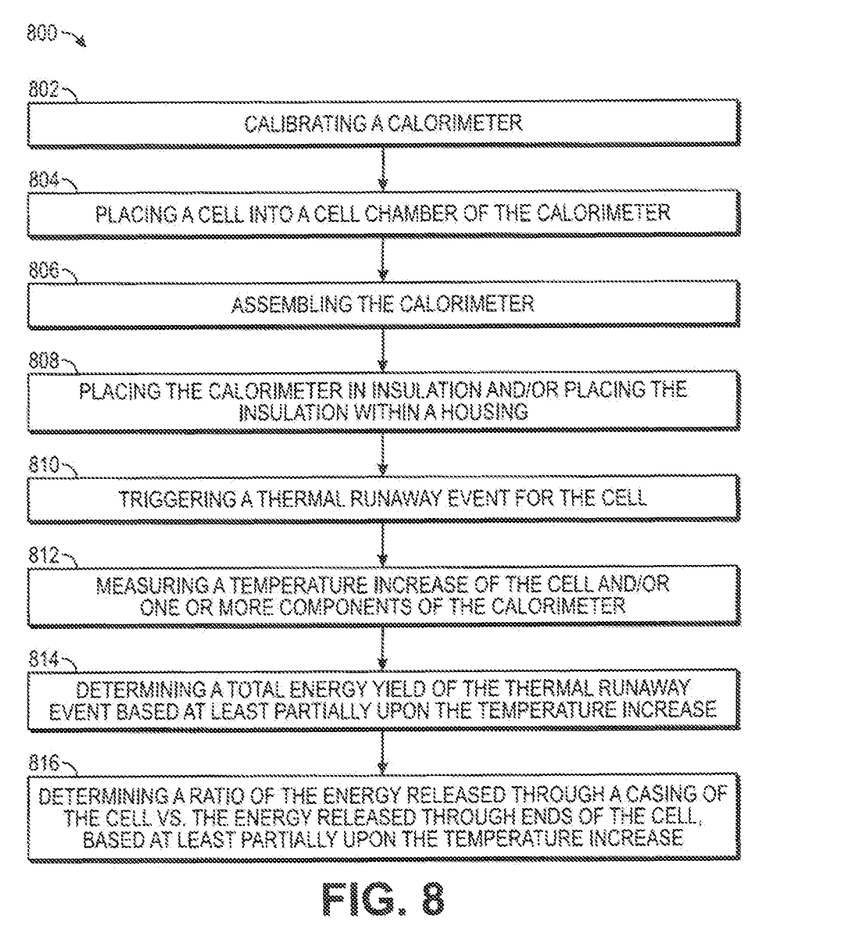
FIG. 8 illustrates a flowchart of a method for measuring a heat response of a cell during a thermal runaway event, according to an embodiment.

FIG. 8 illustrates a flowchart of a method 800 for measuring a heat response of a cell 100 during a thermal runaway event, according to an embodiment. More particularly, the method 800 may be used to measure a total and/or a fractional heat response of the Li-ion cell 100 in thermal runaway (e.g., using the system 200). The method 800 may include calibrating the calorimeter 206, as at 802. The calorimeter 206 may be calibrated by adding a known quantity of heat to the system 200 (e.g., to the calorimeter 206) to determine the heat loss of the calorimeter 206 through the insulation 204. The calibration may enable the accuracy and/or precision of the calorimeter 206 to be measured/determined.

The method 800 may also include placing the (e.g., Li-ion) cell 100 into the cell chamber 214A, as at 804. The method 800 may also include assembling the calorimeter 206 (e.g., after the cell 100 is in the chamber 214A), as at 806. As described above, in one embodiment, only the negative side ejecta mating assembly 212A and the negative side ejecta bore assembly 210A may be used (and the positive side ejecta mating assembly 212B and the positive side ejecta bore assembly 210B may be omitted). In another embodiment, only the positive side ejecta mating assembly 212B and the positive side ejecta bore assembly 210B may be used (and the negative side ejecta mating assembly 212A and the negative side ejecta bore assembly 210A may be omitted). Either of these options may provide single-sided testing. In yet another embodiment, the negative and positive side ejecta mating assemblies 212A, 212B and the negative and positive ejecta bore assemblies 210A, 210B may be used (e.g., for dual-sided testing).

The method 800 may also include placing/encasing the calorimeter 206 in the insulation 204, and/or placing the insulation 204 within the housing 202, as at 808. The method 800 may also include triggering a thermal runaway event for the Li-ion cell 100, as at 810. The thermal runaway event may be triggered using rapid heating (e.g., via the cartridge heaters 216A-D) and/or nail penetration (e.g., through the nail-penetration system mount interface 250). The rapid heating trigger may not penetrate or perforate the cell casing 110. The cell casing 110 may remain within the cell chamber 214A during thermal runaway, even when the gases, ejecta material, and/or windings are ejected from one or both ends of the Li-ion cell 100.

The method 800 may also include measuring a temperature increase of the Li-ion cell 100 and/or one or more components of the calorimeter 206 (e.g., the ejecta mating assembly 212A, 212B, the ejecta bore assembly 210A, 210B, and/or the cell chamber 214A), as at 812. In at least one embodiment, the temperature increase may be measured at least in part by the thermocouple screws 256A, 256B.

The method 800 may also include determining a total energy yield of the thermal runaway event based at least partially upon the temperature increase, as at 814. The total energy yield may be determined by calculating the $m*C_p*\Delta T$, i.e., the change in energy for a general mass, for each component of the calorimeter 206 and adding together. As used herein, m refers to the mass of one or more components in the calorimeter 206, $C_p$ refers to the specific heat capacity of one or more components in the calorimeter 206, and $\Delta T$ a change in temperature of one more components in the calorimeter 206. The total energy may be determined at least partially due to the system 200 trapping all ejected solids, liquids, and gases, the cell casing 110 fitting precisely within the cell chamber 214A, the cell chamber 214A being very conductive, pressure-assisted seals 230A, 230B, 234A, 234B are used for sectional interfaces, the housing 202 includes adiabatic insulation 204 around the calorimeter 206, or a combination thereof.

The method 800 may also include determining a ratio of the energy released (during the thermal runaway event) through the casing/can 110 vs. the energy released (during the thermal runaway event) through ejecta material exiting via ends of the cell 100, based at least partially upon the temperature increase, as at 816. In one example, the ratio may be determined by:

a. adding the energies of the cell casing 110 and the cell chamber assembly 214A together to determine the energy released through the cell casing 110,
b. adding the energy of the negative side ejecta mating assembly 212A, the negative side ejecta bore assembly 210A, the negative side rod 220A, the negative side mesh screen 222A, the negative side baffles 224A, the negative side witness plate 226A, or a combination thereof together to determine the energy released through the negative side ejecta material, and
c. adding the energy of the positive side ejecta mating assembly 212B, the positive side ejecta bore assembly 210B, the positive side rod 220B, the positive side mesh screen 222B, the positive side baffles 224B, the positive side witness plate 226B, or a combination thereof together to determine the energy released through the positive side ejecta material.

In at least one embodiment, the total energy yield and/or the ratio may be determined by the system 200 (e.g., a computing system within the system 200). The computing system may be positioned within or outside the housing 202. The computing system may include one or more processors and a memory system. The memory system may include one or more non-transitory computer-readable media storing instructions that, when executed by at least one of the one or more processors, cause the computing system to perform operations. The operations may include determining the total energy yield and/or determining the ratio.

In light of the principles and exemplary embodiments described and illustrated herein, it will be recognized that the exemplary embodiments can be modified in arrangement and detail without departing from such principles. Also, the foregoing discussion has focused on particular embodiments, but other configurations are contemplated. In particular, even though expressions such as "in one embodiment," "in another embodiment," "in a version of the embodiment" or the like are used herein, these phrases are meant to generally reference the range of possibilities of embodiments, and are not intended to limit the disclosure to the particular embodiments and configurations described herein. As used herein, these terms may reference the same or different embodiments that are combinable into other embodiments.

Similarly, although exemplary processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, differently ordered or otherwise altered.

In view of the wide variety of useful permutations that may be readily derived from the exemplary embodiments described herein, this detailed description is intended to be illustrative only, and should not be taken as limiting the scope of the disclosure.

What is claimed is:

1. A system for measuring a heat response of a cell during a thermal runaway event, comprising:
a housing;
an insulation positioned at least partially within the housing; and
a calorimeter positioned at least partially within the insulation and the housing, wherein:
the calorimeter is configured to have the cell positioned therein,
the calorimeter is configured to measure a temperature increase of the cell, one or more components of the calorimeter, or a combination thereof during the thermal runaway event of the cell,
a total energy yield of the thermal runaway event is configured to be determined based at least partially upon the temperature increase, and
a ratio is configured to be determined based at least partially upon the temperature increase, the ratio comprising: energy released through a casing of the cell during the thermal runaway event vs. energy released through ejecta material from the cell during the thermal runaway event.

2. The system of claim 1, further comprising a computer system configured to determine the total energy yield and the ratio.

3. The system of claim 1, wherein the insulation has a conductivity less than or equal to about 0.04 W m$^{2o}$ C.$^{-1}$.

4. The system of claim 3, wherein the cell chamber comprises a thermocouple configured to measure the temperature increase of the cell, the one or more components of the calorimeter, or a combination thereof during the thermal runaway event of the cell.

5. The system of claim 1, wherein the calorimeter comprises a cell chamber configured to have the cell positioned therein, and wherein a heater is configured to induce the cell into the thermal runaway event when the cell is in the cell chamber.

6. The system of claim 1, wherein the calorimeter comprises an ejecta mating assembly configured to capture one or more electrode windings from the cell during the thermal runaway event.

7. The system of claim 6, wherein the ejecta mating assembly is configured to measure energy associated with the one or more electrode windings.

8. The system of claim 1, wherein the calorimeter comprises an ejecta bore assembly configured to capture ejecta material from the cell during the thermal runaway event.

9. The system of claim 8, wherein the ejecta bore assembly is configured to measure energy associated with the ejecta material.

10. The system of claim 1, wherein the housing comprises a portable, molded shell made at least partially of plastic, and wherein the housing comprises a vent that is configured to allow gases, released from the cell during the thermal runaway event, to exit the calorimeter and the housing.

11. The system of claim 1, wherein the calorimeter comprises:
a rod;
an annular mesh screen positioned at least partially around the rod; and
one or more baffles positioned at least partially around the rod.

12. The system of claim 11, wherein the mesh screen, the one or more baffles, or both prevent ejecta material from passing therethrough while allowing gases to pass therethrough during the thermal runaway event.

13. The system of claim 1, wherein the total energy yield is determined by calculating a change in energy for a general mass for the one or more components in the calorimeter and summing the changes in energy.

14. The system of claim 1, wherein the ratio is determined by:
- summing energies of the casing and the one or more components of the calorimeter to determine an energy released through the casing;
- summing an energy of a first portion of the one or more components on a negative side of the calorimeter to determine an energy released through negative side ejecta material; and
- summing an energy of a second portion of the one or more components on a positive side of the calorimeter to determine an energy released through positive side ejecta material.

15. A system for measuring a heat response of a cell during a thermal runaway event, comprising:
- a housing;
- an insulation positioned at least partially within the housing;
- a calorimeter positioned at least partially within the insulation and the housing, wherein the calorimeter comprises:
  - a cell chamber configured to have the cell positioned therein, and wherein a heater is configured to induce the cell into the thermal runaway event when the cell is in the cell chamber;
  - a first ejecta mating assembly coupled to a first side of the cell chamber and configured to capture one or more electrode windings from the cell during the thermal runaway event; and
  - a first ejecta bore assembly coupled to the first ejecta mating assembly and configured to capture ejecta material from the cell during the thermal runaway event, wherein the calorimeter is configured to measure a temperature increase of the cell, the cell chamber, the first ejecta mating assembly, the first ejecta bore assembly, or a combination thereof during the thermal runaway event of the cell; and
- a computer system configured to determine:
  - a total energy yield of the thermal runaway event based at least partially upon the temperature increase, and
  - a ratio based at least partially upon the temperature increase, the ratio comprising: energy released through a casing of the cell during the thermal runaway event vs. energy released through ejecta material from the cell during the thermal runaway event.

16. The system of claim 15, wherein the calorimeter further comprises:
- a second ejecta mating assembly coupled to a second side of the cell chamber and configured to capture one or more electrode windings from the cell during the thermal runaway event; and
- a second ejecta bore assembly coupled to the second ejecta mating assembly and configured to capture ejecta material from the cell during the thermal runaway event.

17. A method for measuring a heat response of a cell in thermal runaway, comprising:
- placing a cell in a cell chamber of a calorimeter;
- placing the calorimeter in insulation;
- triggering a thermal runaway event for the cell;
- measuring a temperature increase of the cell, one or more components of the calorimeter, or a combination thereof during the thermal runaway event; and
- determining a ratio based at least partially upon the temperature increase, the ratio comprising: energy released through a casing of the cell during the thermal runaway event vs. energy released through ejecta material from the cell during the thermal runaway event.

18. The method of claim 17, further comprising calibrating the calorimeter before triggering the thermal runaway event, wherein calibrating the calorimeter comprises adding a known quantity of heat to the calorimeter to determine heat loss of the calorimeter through the insulation.

19. The method of claim 17, wherein triggering the thermal runaway event comprises introducing heat to the cell via one or more heaters.

20. The method of claim 17, further comprising determining a total energy yield of the thermal runaway event based at least partially upon the temperature increase.

* * * * *